(12) United States Patent
Lipton et al.

(10) Patent No.: US 8,049,962 B2
(45) Date of Patent: Nov. 1, 2011

(54) CONTROLLING THE ANGULAR EXTENT OF AUTOSTEREOSCOPIC VIEWING ZONES

(75) Inventors: Lenny Lipton, Los Angeles, CA (US); Jerilynn Schisser, Petaluma, CA (US)

(73) Assignee: RealD Inc., Beverly Hills, CA (US)

( * ) Notice: Subject to any disclaimer, the term of this patent is extended or adjusted under 35 U.S.C. 154(b) by 1134 days.

(21) Appl. No.: 11/448,281

(22) Filed: Jun. 6, 2006

(65) Prior Publication Data

US 2006/0285205 A1  Dec. 21, 2006

Related U.S. Application Data

(60) Provisional application No. 60/688,100, filed on Jun. 7, 2005.

(51) Int. Cl.
*G02B 27/22* (2006.01)
*H04N 13/04* (2006.01)

(52) U.S. Cl. ............ 359/463; 359/462; 348/42; 348/51; 348/54; 348/59

(58) Field of Classification Search .................. 345/4, 6, 345/30, 32, 33, 48, 50, 55, 84, 87; 348/42, 348/51, 54, 59; 353/7; 359/462, 463, 466, 359/467, 473, 476
See application file for complete search history.

(56) References Cited

U.S. PATENT DOCUMENTS

| | | | |
|---|---|---|---|
| 1,128,979 A | 2/1915 | Hess | |
| 1,970,311 A | 8/1934 | Ives | |
| 3,409,351 A | 11/1968 | Winnek | |
| 4,542,958 A | 9/1985 | Young | |
| 4,740,073 A | 4/1988 | Meacham | |
| 4,804,253 A | * 2/1989 | Stewart | 349/104 |
| 4,807,978 A | 2/1989 | Grinberg et al. | |
| 5,278,608 A | 1/1994 | Taylor | |
| 5,349,419 A | 9/1994 | Taguchi et al. | |
| 5,466,926 A | 11/1995 | Sasano et al. | |
| 5,528,420 A | 6/1996 | Momochi | |
| 5,581,402 A | 12/1996 | Taylor | |
| 5,588,526 A | 12/1996 | Fantone et al. | |

(Continued)

FOREIGN PATENT DOCUMENTS

EP   0520179 A2   12/1992

(Continued)

OTHER PUBLICATIONS

Supplementary European Search Report for co-pending European patent application No. 06772342.9 filed Jun. 6, 2006, European publication No. 1889123 published Dec. 14, 2006 (Applicant RealD Inc. parent company to applicant Real D).

(Continued)

*Primary Examiner* — My-Chau T Tran
(74) *Attorney, Agent, or Firm* — Baker & McKenzie LLP

(57) ABSTRACT

A method and system for providing an increased angular extent of autostereoscopic viewing zones received from a display is presented. The design comprises providing a first column of data having a baseline number of views associated therewith, said first column of data provided to at least one lenticule in a lens sheet associated with the display. The design further comprises altering the first quantity of columns of data to a second quantity of columns of data provided to the at least one lenticule. The second quantity of columns comprises more views than the baseline number of views. Employing the second quantity of columns when constructing an autostereoscopic image provides a display having relatively clear viewing of autostereoscopic images for specific viewing distances.

17 Claims, 4 Drawing Sheets

U.S. PATENT DOCUMENTS

| | | | |
|---|---|---|---|
| 5,697,006 A | 12/1997 | Taguchi et al. | |
| 5,808,792 A | 9/1998 | Woodgate et al. | |
| 5,850,580 A | 12/1998 | Taguchi et al. | |
| 5,875,055 A | 2/1999 | Morishima et al. | |
| 5,933,276 A * | 8/1999 | Magee | 359/455 |
| 6,008,484 A | 12/1999 | Woodgate et al. | |
| 6,055,013 A | 4/2000 | Woodgate et al. | |
| 6,064,424 A | 5/2000 | van Berkel et al. | |
| 6,094,216 A | 7/2000 | Taniguchi et al. | |
| 6,118,584 A * | 9/2000 | Van Berkel et al. | 359/463 |
| 6,224,214 B1 | 5/2001 | Martin et al. | |
| 6,302,541 B1 | 10/2001 | Grossman | |
| 6,373,637 B1 | 4/2002 | Gulick, Jr. et al. | |
| 6,456,340 B1 * | 9/2002 | Margulis | 348/745 |
| 6,476,850 B1 | 11/2002 | Erbey | |
| 6,481,849 B2 | 11/2002 | Martin et al. | |
| 6,519,088 B1 | 2/2003 | Lipton | |
| 6,574,042 B2 * | 6/2003 | Allio | 359/463 |
| 6,736,512 B2 | 5/2004 | Balogh | |
| 6,801,243 B1 | 10/2004 | Van Berkel | |
| 6,816,158 B1 | 11/2004 | Lemelson et al. | |
| 6,825,985 B2 | 11/2004 | Brown et al. | |
| 6,847,354 B2 | 1/2005 | Vranish | |
| 6,859,240 B1 | 2/2005 | Brown et al. | |
| 7,091,931 B2 | 8/2006 | Yoon | |
| 7,365,908 B2 * | 4/2008 | Dolgoff | 359/463 |
| 7,375,886 B2 * | 5/2008 | Lipton et al. | 359/463 |
| 2001/0050686 A1 * | 12/2001 | Allen | 345/543 |
| 2002/0015007 A1 * | 2/2002 | Perlin et al. | 345/6 |
| 2003/0107804 A1 * | 6/2003 | Dolgoff | 359/463 |
| 2004/0046709 A1 | 3/2004 | Yoshino | |
| 2004/0135741 A1 | 7/2004 | Tomisawa et al. | |
| 2004/0263969 A1 * | 12/2004 | Lipton et al. | 359/463 |
| 2006/0284974 A1 * | 12/2006 | Lipton et al. | 348/59 |
| 2007/0035829 A1 | 2/2007 | Woodgate et al. | |
| 2007/0109401 A1 * | 5/2007 | Lipton et al. | 348/59 |

FOREIGN PATENT DOCUMENTS

| | | |
|---|---|---|
| EP | 0654701 A1 | 5/1995 |
| JP | 04018891 A1 | 1/1992 |
| JP | H08-314034 | 11/1996 |
| JP | H08-327948 | 12/1996 |
| JP | H09-236777 | 9/1997 |

OTHER PUBLICATIONS

European examination report in co-pending European application No. 06772342.9 dated Jan. 31, 2011.

* cited by examiner

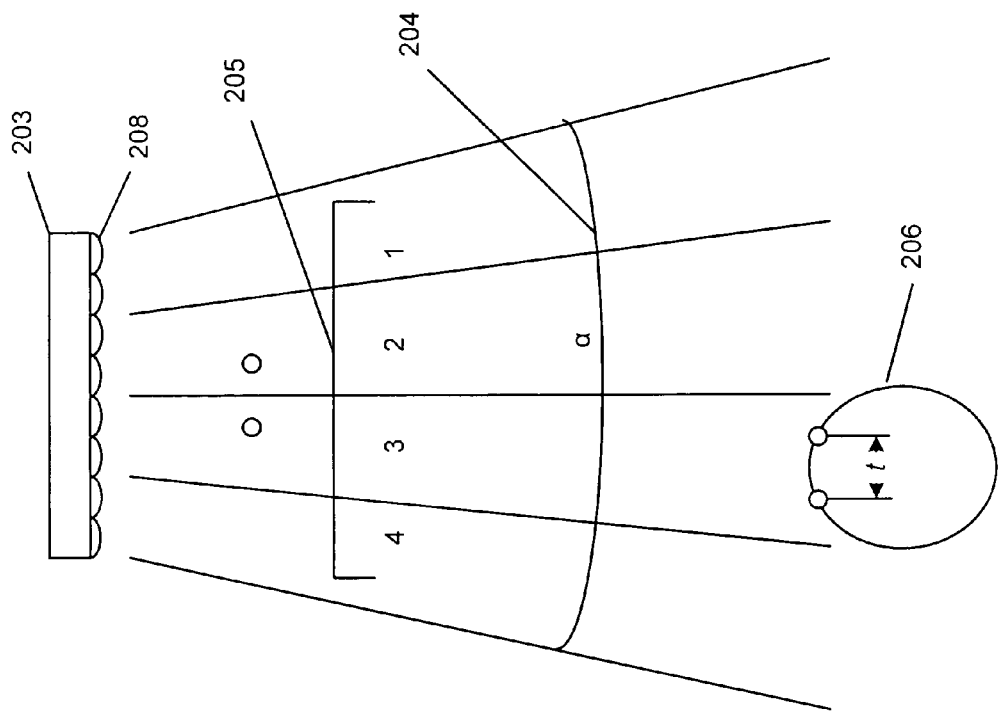
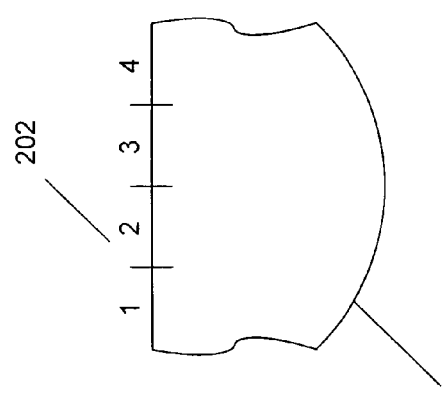
FIG. 2B
FIG. 2A

CONTROLLING THE ANGULAR EXTENT OF AUTOSTEREOSCOPIC VIEWING ZONES

This application claims the benefit of U.S. Provisional Patent Application Ser. No. 60/688,100, filed Jun. 7, 2005, entitled "Controlling the Angular Extent of Autostereoscopic Viewing Zones," inventors Lenny Lipton et al., the entirety of which is incorporated herein by reference.

BACKGROUND OF THE INVENTION

1. Field of the Invention

The present design relates to the projection of autostereoscopic images, and in particular to producing a strong depth effect for autostereoscopic images received from an autostereoscopic display over a broad range of viewing distances from the display.

2. Description of the Related Art

Autostereoscopic displays use lenticular sheets (and in some cases raster barriers, more or less optically interchangeable with lenticular sheets) as a selection device to enable viewing of a stereoscopic image without the use of individual selection devices (glasses) worn by the observer. The term of art used for these kinds of displays, when more than two views are provided, is "panoramagram," or sometimes "parallax panoramagram."

In a panoramagram, multiple perspective views are combined to be imaged by the lens sheet as explained by Okoshi in *Three Dimensional Imaging Techniques*, NY Academic Press, 1976. In lenticular (or raster barrier) stereoscopic displays, one concern is head movement or user position relative to the display. Head movement in the horizontal direction results in the observer seeing changes of perspective within a viewing zone, where a viewing zone is a spatial region, relative to the display, wherein images on the display are viewed. Perspective views repeat in adjacent viewing zones when transitioning from zone to zone, such as by an observer moving between viewing zones. In other words, the changing perspectives that occur in the primary viewing zone, as one moves laterally, repeats in the secondary and other peripheral zones. These secondary, tertiary, and nth order viewing zones have image quality similar to the primary zone. Beyond the nth order zone, comparative image quality tends to significantly degrade. Performance is symmetrical about the primary zone and the angular extent of the zones is similar. The transition from zone to zone is typically brief with the total of all zones providing the maximum angular extent of viewable image.

As selection occurs at the plane of the screen, many perspective views are required to provide a viewing zone having large angular extent. In the case of a display where only two views are provided, which is sometimes called a parallax stereogram, little head movement is permissible, and the observer's position is restricted. Such restriction of movement is both uncomfortable and undesirable.

The electronic display panoramagram can be adjusted to function well in two different viewing situations. The first is a range of walk-up viewing distances from, for example, 4 to 15 feet away from the display, and also from a distance that is in keeping with, for example, an airport environment where the display is mounted overhead and viewed from 15 feet or more. Currently no panoramagrams commercially available perform well in both scenarios.

Previously available designs therefore have issues with variance in viewer position relative to the display. It would be advantageous to offer a design that enhances or optimizes the autostereoscopic display of images by enabling the viewer to be positioned at various distances from the display.

SUMMARY OF THE INVENTION

According to one aspect of the present design, there is provided a method and system for providing an ability to alter an angular extent of a panoramagram viewing zone received from a display having a first quantity of columns of data associated therewith. The design comprises providing a first column of data having a baseline number of views associated therewith, said first column of data provided to at least one lenticule in a lens sheet associated with the display. The design further comprises altering the first quantity of columns of data to a second quantity of columns of data provided to the at least one lenticule. The second quantity of columns comprises more views than the baseline number of views. Employing the second quantity of columns when constructing an autostereoscopic image provides a display having relatively clear viewing of autostereoscopic images for specific viewing distances.

These and other advantages of the present invention will become apparent to those skilled in the art from the following detailed description of the invention and the accompanying drawings.

BRIEF DESCRIPTION OF THE DRAWINGS

FIG. 2A is a close-up cross-section of a single lenticule of a lenticular array, showing perspective views associated with a flat panel display.

FIG. 2B is a schematic representation of the viewing space of the optical design of FIG. 2A;

DETAILED DESCRIPTION OF THE INVENTION

Figure 1B:
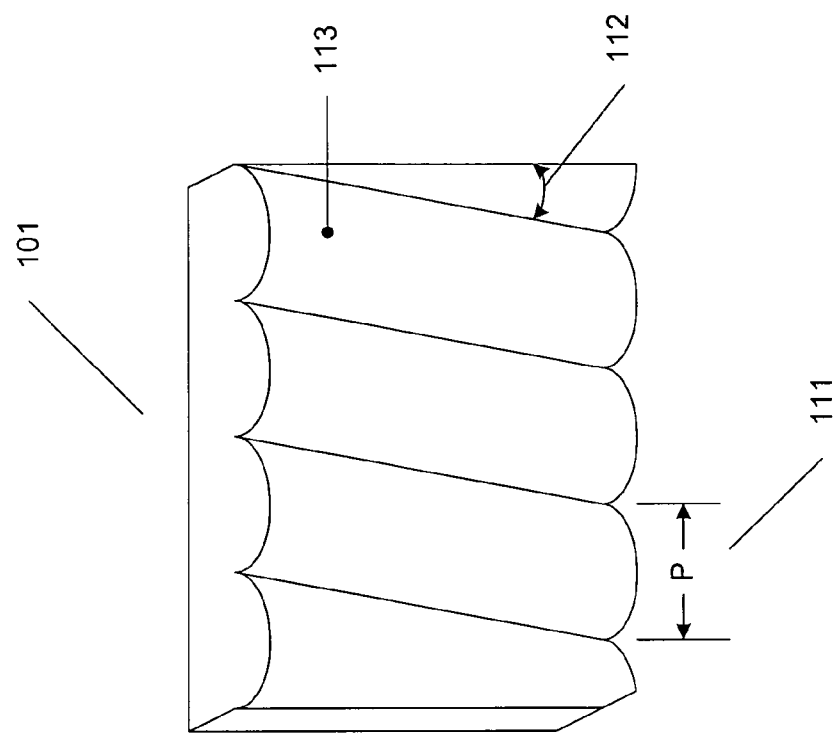
FIG. 1B is a perspective view of a Winneck-type lenticular array.
Figure 1A:
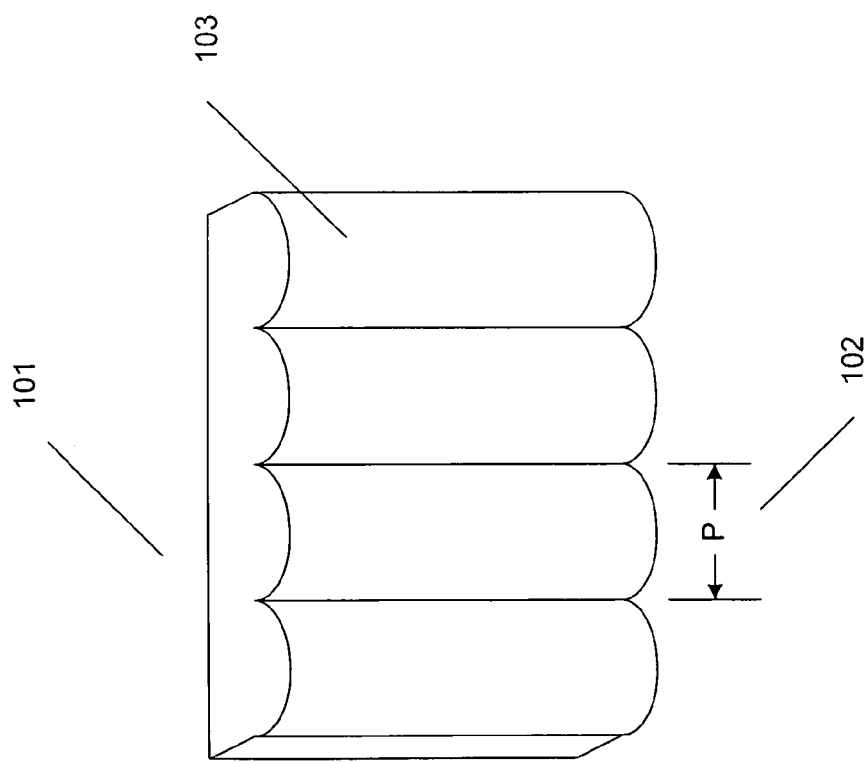
FIG. 1A is a perspective view of a lenticular array.

The present design uses refractive semi-cylindrical lenticules of the types shown in FIGS. 1A and 1B. In such a construction, two related types of lens sheets are available, both having similar characteristics. Lenticular sheets or raster barriers enable viewing of a stereoscopic image without the use of individual selection devices (glasses) worn by the observer, and are optically interchangeable. The present teachings apply to both types of selection devices.

In order to see an autostereoscopic image, the observer must be within a certain distance range from the display, not too close and not too far. From too far a distance, the observer will see views with reduced perspective differences, as can be seen by comparing FIGS. 2B and 3B, as will be discussed more fully below. The strength of the stereoscopic depth effect is proportional to the interaxial separation between camera locations, said cameras existing in the visual world or a computer universe. The perspective views within a specific zone or region tend to fan out in space and the stereoscopic depth effect observed is accounted for by the particular stereopair seen by the observer. In a limiting case from a great enough distance from the display, no perspective differences exist since the observer sees only one perspective.

The present design addresses this problem and provides a software change resulting in a stereoscopic depth effect wherever the observer may be located over a broad range of viewing distances. A display may be useful in point-of-sale applications of from, for example, four to fifteen feet. The same display, in certain circumstances, preferably functions over a different range of viewing distances, for example from 15 to 30 feet, and still provides a stereoscopic viewing experience. The angular extent of the viewing zone may be reduced to provide enough perspective difference for stereoscopic viewing. In this way the eyes of the observer see perspective views generated or captured from a greater interaxial separation. Although the angular extent of the zone is reduced, in order to achieve a good stereoscopic effect from a greater distance, the width of the viewing zone may still be large since the distance from the display is also greater. For a given angle, the greater the viewing distance the greater the width of the viewing zone.

The present design maintains the viewing zone's horizontal width, but not angular extent, when an observer is at a given distance further away. In other words, the depth effect for far viewing is maintained as compared with close viewing.

In operation, when an observer moves left or right away from the center of the display, she or he views image columns adjacent to the primary column. Each column comprises a complete set of perspective views. Primary columns are located directly behind the associated lenticule, as shown in FIG. 2A. Thus the same lenticules, when used for viewing off axis, provide imaging for perspective columns either to the left or right of the column in closest proximity, here called the "primary column." Within limits, the behavior of non-primary viewing zones is similar to that of the primary zone.

In addition to the importance of the horizontal or the side-to-side location of the head, the observer's distance from the display is also important. If the image is optimized for close-in viewing, for example, as the observer moves further away, the stereoscopic effect is diminished, which is undesirable.

The angular extent of a viewing zone is of key importance in controlling the stereoscopic depth effect. The narrower a viewing zone, the deeper the stereoscopic effect. The wider the viewing zone, the more readily an observer can locate himself to see a good stereoscopic image. Since a limited number of perspective views are available, a balance is sought between the angular extent of the viewing zone and the depth effect. It is desirable to have the largest possible angular extent for a viewing zone, but given a limited number of perspective views, increasing the angular extent of the viewing zone reduces the depth effect, given that the observer is at a constant distance. On the other hand, decreasing the angular extent of the zone increases the depth effect but limits the area in which a stereo image may be seen. The important parameter is not necessarily the angular extent of the zone but rather the horizontal width of the zone at a given viewing distance.

Control of the angular extent of the viewing zone is of critical concern. Typically there is a primary viewing zone, secondary and tertiary viewing zones of more or less equal angular extent on either side of the primary zone, and stereoscopic images may be viewed in other peripheral zones. The angular extent of the secondary, tertiary, and other peripheral viewing zones typically corresponds with the angular extent of the primary viewing zone.

The present design is a novel electronic panoramagram using a lenticular array (or a raster barrier). The present design further comprises making a software change to the interdigitation process that allows the display monitor to be used in different locations at different distances without changes to the lenticular screen.

The term interdigitation, which some writers call interleaving, and Interzigging, the term used by StereoGraphics Corp., is a process in which multiple perspective views are sampled and then mapped into a single image file. In its simplest form, as described by Hess in U.S. Pat. No. 1,128,979, left and right images are optically sliced vertically and alternated for juxtaposition behind a lenticular screen. In the classic hardcopy optically produced panoramagram, wherein many views exist, each view is sampled and arranged in image stripes behind each vertical-going lenticule. A lenticular screen of this type is shown in FIG. 1A. The repeating perspective view arrangement of stripes is a column, and one column is the same width as, and directly behind, a vertical-going lenticule. For computer interdigitation, the stripe and column explanation is a simplification. A more complex mapping may be required as necessary when using a Winnek lens array such as that of FIG. 1B. The present design employs the stripes and column explanation with regard to FIGS. 2A and 3A parts 202 and 301.

FIG. 1 shows a lenticular display 101A made up of semi-cylinders or a corduroy-like structure 103. Back surface of lenticular display 101A faces an electronic display 101. The electronic display surface 101 is typically a flat panel display. The pitch of the lenticules 102 may be defined as the width of the lenticule, shown by P enclosed within arrows. The boundaries or intersections of the semi-cylinders are mutually parallel and parallel to the vertical edges of the display 101, where the display has a conventional rectangular shape.

FIG. 1B shows a variation on this scheme, employing the design of Winnek as shown in U.S. Pat. No. 3,409,351. The intersection boundaries of the semi-cylinders while mutually parallel are not parallel to the vertical edges of the display, but rather are tipped at an angle as shown at point 112. This diagonal-going lens sheet 113 is associated with flat panel display 101. Without loss of generality, the technique shown here applies to a standard vertical-going lenticular array, a Winnek diagonal-going array, or raster barrier arrays that follow the vertical-going orientation or Winnek teaching.

FIG. 2A shows a cross-section of a single lenticule 201, and an associated section of a display image column 202, with cross-sections of stripes labeled 1,2,3,4, to denote the individual perspective views imaged by the lenticule. Any number of views may be employed but four are presented for simplicity. The design of FIG. 2A applies to both the vertical-going lenticule, the Winnek-tipped lens sheet, and raster barrier selection devices which may also be vertical-going or Winnek-tipped. For the purpose of simplifying the discussion, the drawings are not made to accurate proportions. In some cases there are exaggerations or simplifications, made for the purpose of facilitating explanation.

FIG. 2B shows electronic display panel 203 covered by a lens sheet 208, where the lens sheet 208 is made up of a multiplicity of individual lenticular elements as given by FIG. 2A. The space in front of the display includes the primary viewing zone 204, whose angular extent is given by α. This angular extent is compared to the primary viewing zone depicted in FIG. 3B. The angular extent of the primary viewing zone depicted in FIG. 2B is approximately twice as great as that of the zone depicted in FIG. 3B.

Figure 3B:
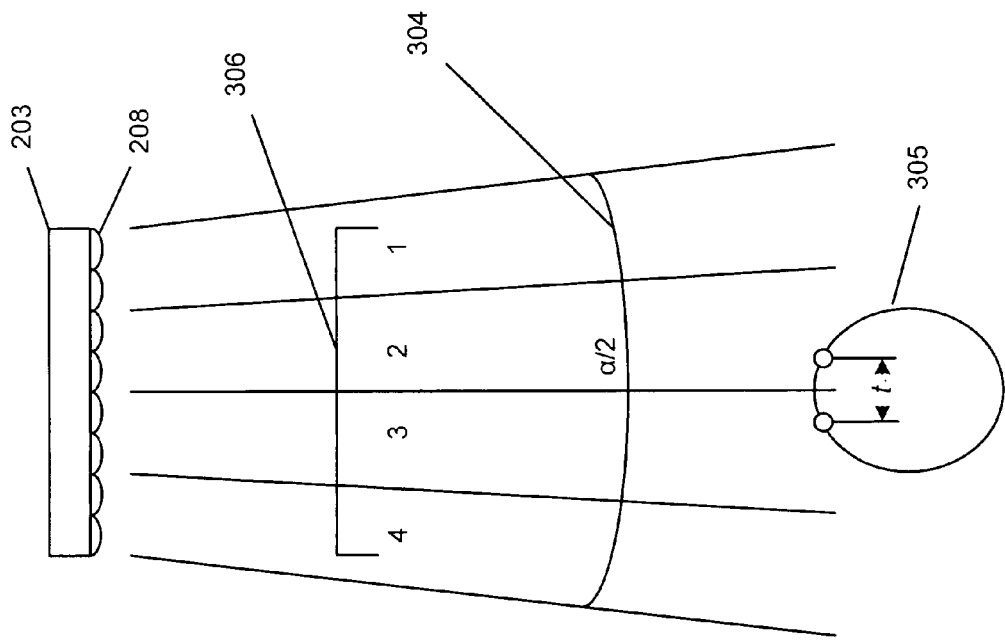
FIG. 3B is a schematic representation of the viewing space of the optical design of FIG. 3A.

For simplicity the secondary, tertiary, and other peripheral viewing zones are not illustrated here, having characteristics as described above. The design aspects and optical phenomena discussed here apply to these zones and when the angular extent of the primary viewing zone changes, the peripheral zones change proportionately. Fanning out in viewing space, four perspective views are shown, each view corresponding to the perspective views illustrated in FIG. 2A by point 202. Since an electronic display with a definite pixel structure is employed, a perspective view may be made up of an aggregate of pixels or sub-pixels. Each of the views occurs in a more or less vertical slice fanning out in space. The top view of FIG. 3B presents a zone sliced like pieces of pie, with perspective subsections labeled 4, 3, 2, and 1 going from left to right. The directional change for the subsections results because the lenticule 201 optically inverts the perspectives 202.

A pair of eyes given by 205 is shown at a greater distance at point 206. The interpupillary distance is the same for both eyes and given by t. From FIG. 3B, it is necessary to straddle a viewing zone in order to see a stereo view. As an example, views 2 and 3 are for an observer at point 205. If the observer is far enough away, at the distance indicated by point 206, the left and right eyes may see no perspective difference because the observer's eyes will be within the extent of a single stripe, as denoted by stripe 3 in this case.

Certain optimum ranges result for viewing a panoramagram, and as the observer moves further away from the display 203 with lens sheet 208, the opportunity to see a stereopair is reduced. As the observer gets closer to the display, the views making up the stereopair seen are produced with an interaxial separation greater than that afforded when the observer is further from the display. Thus, being close to the display, within limits, provides a strong stereoscopic effect and conversely, being further away provides a reduced stereoscopic effect. In the limiting case no stereoscopic effect exists, as may be appreciated with reference to point 206. The stereoscopic effect is also a function of the angular extent of the viewing zone since the wider the zone, the further apart the perspective views perceived given a fixed t. Conversely, the narrower the extent of the zone, the deeper the image appears because the perspective views seen are photographed or captured from a greater distance. The strength of the stereoscopic effect is a function of the interaxial separation of the stereopair, or the distance between the generated or captured images.

The present design enables the observer to see the same views with the left and right eyes at a great distance from the display as may be seen when the observer is positioned a close distance.

Figure 3A:
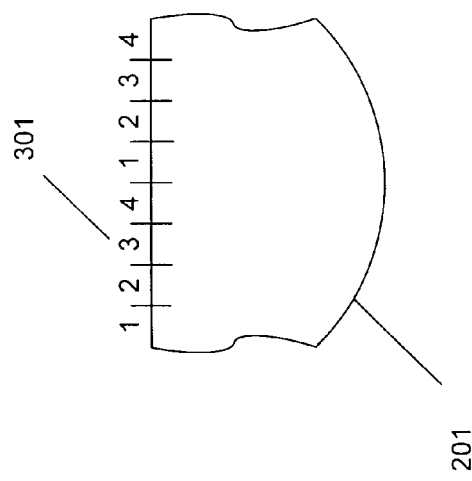
FIG. 3A is a close-up cross-section of a single lenticule of a lenticular array, showing perspective views associated with a flat panel display.

FIGS. 3A and 3B graphically represent increasing the strength, or "pop," of the stereo effect. One approach is to change or swap the lens sheet. Increasing the focal length or focal lengths of the lenticules enables narrowing the angular extent a of the viewing zone 204. Changing or swapping lenses is impractical in real-world situations. The present design repeats, under each single lenticule within the pitch and within the width of the stripe, the perspective views two times, as shown by point 301. In effect this perspective view repetition treats the display in the interdigitation process as if the lenticular pitch was twice as fine, or the width of a lenticule was half its actual physical width. In this implementation, an image column is the same width as the width or pitch of the lens. Therefore, each set of perspective views is repeated twice so that the perspective views given by 1, 2, 3, and 4 are repeated again as 1, 2, 3, and 4 under each lenticule, as shown at point 301. Point 301 is associated with lenticule 201 which is identical to the lenticule used in FIG. 2A. FIG. 3A shows perspective views or stripes 1,2,3,4,1,2,3,4, denoted by point 301, occupying the same column width as 1,2,3,4 in FIG. 2A. The lenticule shown 201 is simply one lenticule of the illustrated lens sheets from FIGS. 1A and 1B. By way of simplification the foregoing uses a repetition of a factor of two as an example, but other larger factors can work as well.

FIG. 3B illustrates that using this repetition halves the extent of the viewing zone so that the angle at point 304, $\alpha/2$, is now half the horizontal angular extent of the primary viewing zone depicted in FIG. 2B. Similarly, the secondary and tertiary zones are also reduced in angular extent. For electronic display 203 with lens sheet 208 (identical to the part as shown in FIG. 2B) the perspective striped sequence repeats twice under a single lenticule. Thus the pattern that had been 1,2,3,4 is repeated and the number of columns under a lenticule is doubled so that the pattern under the lenticule is 1,2,3,4,1,2,3,4.

The observer 305, positioned at the same distance as shown in FIG. 2B at 206, now has the ability to see perspective views at point 306 having interaxial separation greater than available in FIG. 2B. In the example shown in FIG. 3B, as compared with FIG. 2B, the observer with interpupillary separation fixed at t now sees perspective views 3 and 2, rather than simply view 3. This now results in the perception of a stereoscopic view. This particular example is a limiting case in which the improvement goes from non-stereoscopic viewing to stereoscopic viewing. A similar effect applies with regard to the observer seeing perspective views that are further apart. For example, if at a given distance the observer sees views 3 and 2, with the reduction in the angular extent of the zone as taught here, the observer may see views 4 and 1 with the result that he is seeing a deeper stereoscopic image.

The same rationale is valid for secondary, tertiary, and other peripheral viewing zones. The design may comprise repeating the pattern three times, for example, 1,2,3,4,1,2,3, 4,1,2,3,4, or in point of fact n times. The ability to repeat the pattern of perspective views and reduce the angular extent of the viewing zone, and hence increase the stereoscopic effect, is limited only by the resolution of the display. Repeating the pattern enables the observer to see a strong stereoscopic effect further away from the display. An observer relatively far from the display causes a reduction in resolution such that the images can scarcely be seen.

The present discussion presents use of four views, when in fact there is no such limitation. Any number of views, including nine, 16, or other numbers of views may be employed. Moreover, the procedure, while described here for the case of a refractive or lenticular display, applies to raster barriers as well. Further, although the design is illustrated herein by way of showing what happens with an individual lenticule, the one lenticule is simply representative of the activities under the entire lens sheet, which may comprise tens of thousands of lenticules.

The present design may be implemented on any of a number of devices and/or displays, including but not limited to an Apple Cinema Monitor with a 30-inch diagonal display screen with a resolution of 2560 by 1600 pixels. This monitor's resolution is large by contemporary standards and allows enough pixels under a lenticule to repeat the perspective pattern. In such a configuration, a relatively thin glass substrate may be employed, such as one on the order of 0.090-inch, onto which may be cast lenticules whose pitch is on the order of 0.80 mm. Proprietary interdigitation algorithms or other interdigitation algorithms, such as Interzig by StereoGraphics Corporation, may be employed. Interzig takes into account the optics of the Winnek-type lens sheet as described above.

When using a slanted arrangement of this kind the views are mapped not only in rows, containing columns and perspective stripes, parallel going to the horizontal edge of the display, but the views are also arranged in the vertical or actually diagonal direction within a column. A multiple view perspective image group may be employed, such as a nine-perspective view image group. For a traditional vertical going panoramagram, nine stripes within a column are provided in the design with a progression of the stripes along a row within a column beneath a single lenticule, progressing from 1 through 9.

With a Winnek arrangement, the image group occupies several rows under a lenticule but the foregoing principles still apply. The present description employs the traditional panoramagram with vertical going lenticular boundaries for didactic purposes, but some additional complexities may need to be addressed depending on the application. Whether the views are arranged progressively in one row on a column-by-column basis under each lenticule, with a column formed by the perspectives interdigitated into stripes under a row, or whether the perspective views are arranged in a more complex fashion required by the Winnek arrangement, the overall principle with respect to the design, i.e. providing a multiplicity of perspective views wherein a limited number of perspective views had previously been provided. For a flat panel display, pixels are made up of clusters of red, green, and blue sub-pixels. The design tends to be more complex because interdigitation algorithms such as the Interzig mapping algorithm take into account and compute values based on sub-pixel manifestations.

One implementation of the current design uses a pixel per lenticule (P/L) arrangement of roughly 3.204. This provides nine views within a column under a lenticule. Changing the P/L ratio to roughly 1.602 gives 18 views under each lenticule with a repletion pattern of 1 . . . 9, 1 . . . 9. The viewing zone was halved in angular extent and the depth effect was vastly strengthened when viewed from a great distance. In particular, with the P/L at at roughly 3.204, a good stereoscopic image within a viewing zone of 10-degree angular extent from about 5 to 15 feet may be viewed. In addition to the primary zone, good secondary, tertiary zones, and two additional outer zones provide for reasonable viewing, a total of 7 good viewing zones. Halving the P/L to approximately 1.602 can provide a good stereo view beyond 15 feet. The number of good viewing zones increases using the present design.

Despite the fact that the angle of view of the zone is halved, the head box, or horizontal extent of allowable head travel within the new zone, is substantial and allows for ease of viewing. One can imagine the viewing zone forming an isosceles triangle with its vertex in proximity to the plane of the display. The viewing zone width, as measured by a line contained within a plane parallel to the surface of the display and also parallel to the horizontal edge of the display, is approximately proportional to the distance from the screen. For the case where the zone's angular extent is reduced by half, doubling the viewing distance can result in approximately the same zone width. In such a case the same perspective stripes (depending upon the side-to-side or lateral location within the zone) may be observed even though the observer is at a greater distance. Thus the stereoscopic depth effect is maintained for a greater overall distance. Images using this design tend to look relatively sharp, despite the fact that the resolution of the images under a lenticule is halved. The observer being positioned considerably further from the display can compensate for the reduction in resolution determined by the number of pixels available for image formation.

In addition to the extension of the ability to perceive depth from a greater distance, the design presented here can also be used to increase the depth effect within the usual viewing distance range, since the reduction in viewing zone angular extent will have the effect of presenting stereopairs to the eyes having interaxial separation greater than before the zone extent reduction.

Thus changing the interdigitation constants in software can provide a repeating pattern of the perspective views under each lenticule of the lens sheet, and by this means the angle of view may be halved and with an accompanying increase in the stereoscopic effect when the viewer is at, for example, twice his original distance from the display. In this way, the same autostereoscopic display that is viewed enjoyably from a short distance can be made to have an increased stereoscopic depth effect from a great distance.

Figure 4:
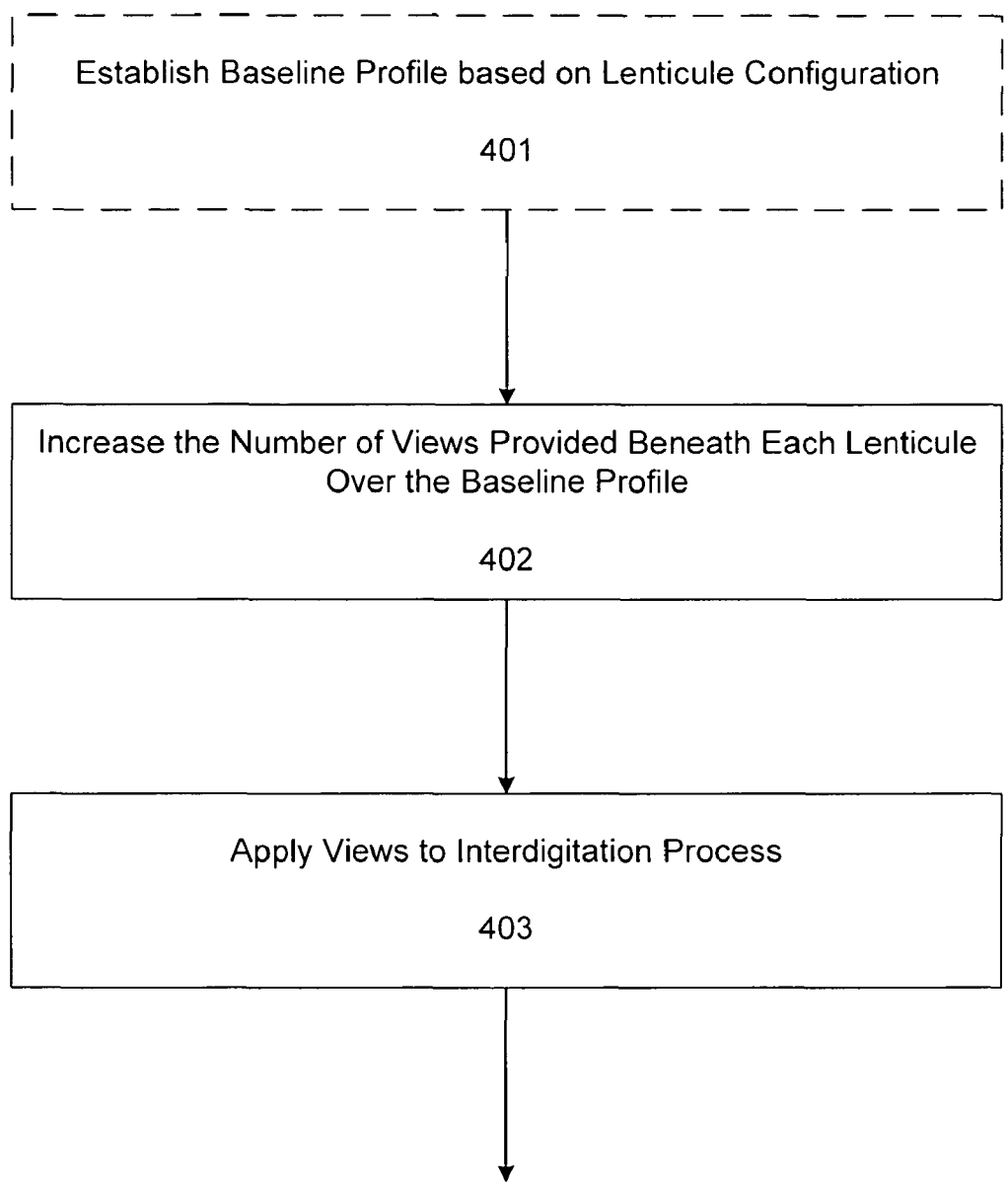
FIG. 4 is a general flowchart of operation of the present design.

The general design reflected herein is represented in FIG. 4. In general, the software may, but is not required to, establish a baseline profile at point 401, the baseline profile representing a number of views offered beneath a single lenticule. In one of the foregoing examples, views 1,2,3,4 are presented. Point 402 represents increasing the number of views offered beneath the lenticule, such as doubling or otherwise multiplying the number of views by a factor, resulting in, for example, views 1,2,3,4,1,2,3,4,1,2,3,4 being beneath the same lenticule. The values or views so presented are then applied to an interdigitation process or program at point 403. A general purpose processor or computing device may establish the number of views provided beneath each lenticule based on a baseline, expected baseline, or generally understood number of views, and may compute an increased number of views to be transmitted. The processor may then pass the number of views per lenticule and the actual views to the interdigitation program, or may enlist a memory device or other appropriate devices or circuitry to provide the computed number of views to an interdigitation processing device or module for interdigitation or interzigging in the case of the StereoGraphics Corporation proprietary software.

An alternate way of looking at the design is that the design provides an ability to alter an angular extent of a panoramagram viewing zone received from a display having a first quantity of columns of data associated therewith. The design provides a first column of data having a baseline number of views associated therewith. The first column of data provided to at least one lenticule in a lens sheet associated with the display. The design further comprises providing a second quantity of columns of data altered from the first quantity of columns of data to the at least one lenticule. The second quantity of columns comprises more views than the baseline number of views. Employing the second quantity of columns when constructing an autostereoscopic image provides a display having relatively clear viewing of autostereoscopic images for specific viewing distances.

The devices, processes and features described herein are not exclusive of other devices, processes and features, and variations and additions may be implemented in accordance with the particular objectives to be achieved. For example, devices and processes as described herein may be integrated or interoperable with other devices and processes not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for providing an ability to alter an angular extent of a panoramagram viewing zone received from a display having a first quantity of columns of data associated therewith, comprising:
   providing the first quantity of columns of data having a baseline number of views associated therewith, wherein the baseline number of views is greater than one, said first quantity of columns of data provided to at least one lenticule in a lens sheet associated with the display; and
   providing a second quantity of columns of data altered from the first quantity of columns of data to the at least one lenticule;
   wherein the second quantity of columns of data comprises more views than the baseline number of views, and further wherein employing the second quantity of columns of data when constructing an autostereoscopic image provides a display having relatively clear viewing of autostereoscopic images for specific viewing distances.

2. The method of claim 1, wherein each lenticule is provided at an angle offset from a vertical orientation.

3. The method of claim 1, wherein the more views comprises an integer multiple of the baseline number of views, said integer being at least two.

4. The method of claim 1, further wherein the more views provide reduced angular viewing zones from the display while relatively clear viewing is available at a greater distance from the display.

5. The method of claim 1, wherein each view is arranged progressively in one row on a column-by-column basis under each lenticule, with a column formed by the perspectives interdigitated into stripes under a row.

6. The method of claim 1, wherein the lens sheet is formed of a glass substrate.

7. A method of transmitting autostereoscopic images to a display having a lens sheet comprising at least one lenticule formed therein, the method using an interdigitation process forming autostereoscopic images from multiple views, the method comprising:
   determining an enhanced number of views provided to the at least one lenticule, the enhanced number of views comprising more views than a baseline number of views, wherein the baseline number of views is greater than one;
   wherein employing the enhanced number of views in constructing autostereoscopic images subsequently provided to the display provides for relatively clear viewing of the autostereoscopic images within specific viewing zones.

8. The method of claim 7, wherein each lenticule is provided at an angle offset from a vertical orientation.

9. The method of claim 7, wherein the enhanced number of views comprises an integer multiple of the baseline number of views, said integer being at least two.

10. The method of claim 7, further wherein employing the enhanced number of views provides reduced angular viewing zones from the display while relatively clear viewing is available at a greater distance from the display.

11. The method of claim 7, wherein views are arranged progressively in one row on a column-by-column basis under each lenticule, with a column formed by the perspectives interdigitated into stripes under a row.

12. The method of claim 7, wherein the lens sheet is formed of a glass substrate.

13. An apparatus configured to provide an increased angular extent of autostereoscopic viewing zones for a display having a lens sheet associated therewith, the lens sheet having at least one lenticule, the apparatus comprising:
   a processor configured to determine an enhanced number of views provided to the at least one lenticule, the enhanced number of views comprising more views than a baseline number of views, wherein the baseline number of views is greater than one;
   wherein employing the enhanced number of views in constructing autostereoscopic images subsequently provided to the display provides for relatively clear viewing of autostereoscopic images within specific viewing zones.

14. The apparatus of claim 13, wherein the lens sheet has a plurality of lenticules, and each lenticule is provided at an angle offset from a vertical orientation.

15. The apparatus of claim 13, wherein the enhanced number of views comprises an integer multiple of the baseline number of views, said integer being at least two.

16. The apparatus of claim 13, wherein employing the enhanced number of views provides reduced angular viewing zones from the display while relatively clear viewing is available at a greater distance from the display.

17. The apparatus of claim 13, wherein views are arranged progressively in one row on a column-by-column basis under each lenticule, with a column formed by the perspectives interdigitated into stripes under a row.

* * * * *